Dec. 2, 1947.  E. F. ROSSMAN  2,431,966
SHOCK ABSORBER
Filed Aug. 26, 1946
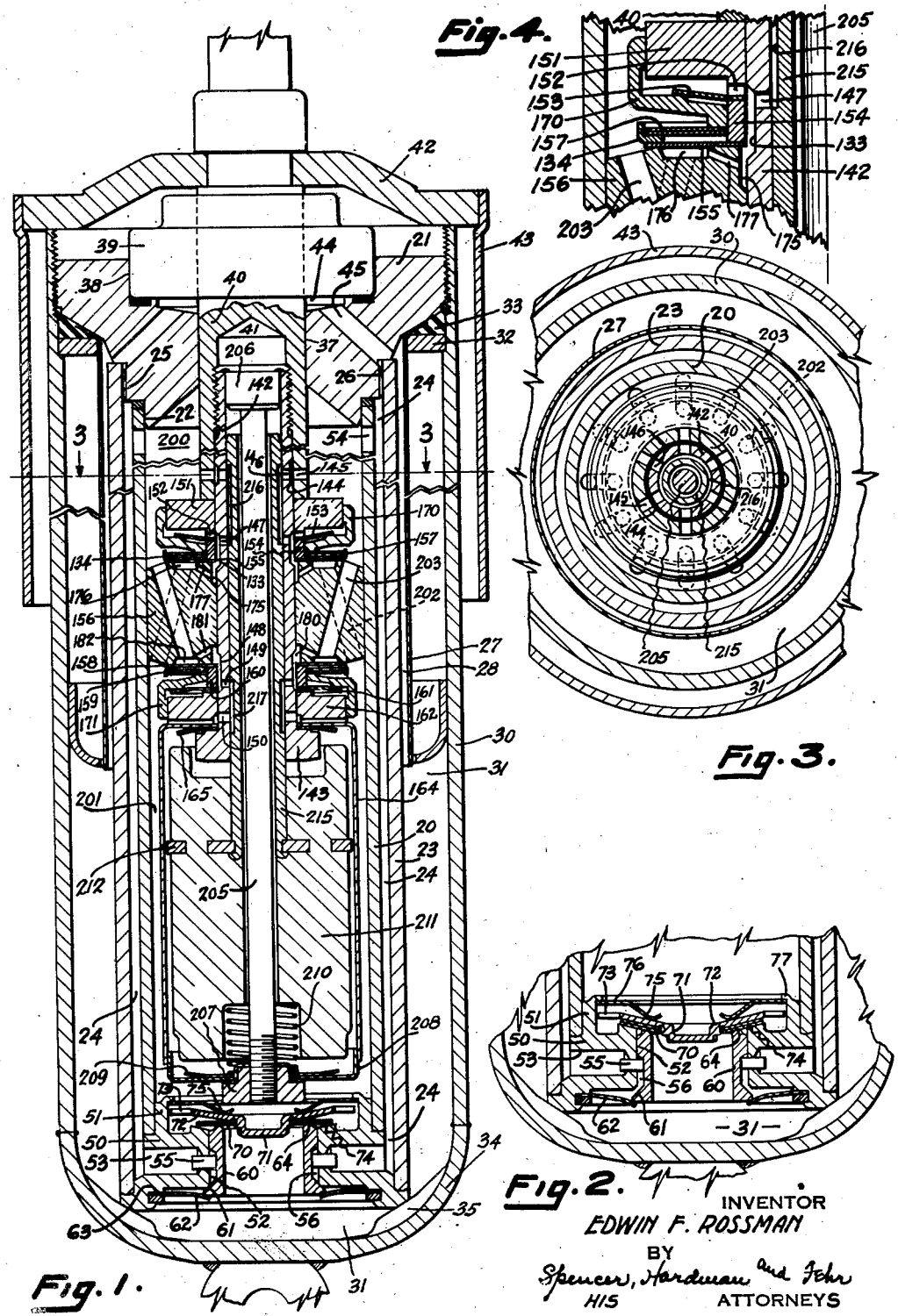
INVENTOR
EDWIN F. ROSSMAN
BY
Spencer, Hardman and Fehr
HIS ATTORNEYS Patented Dec. 2, 1947

2,431,966

UNITED STATES PATENT OFFICE 2,431,966

SHOCK ABSORBER

Edwin F. Rossman, Dayton, Ohio, assignor to General Motors Corporation, Detroit, Mich., a corporation of Delaware Application August 26, 1946, Serial No. 693,030

11 Claims. (Cl. 188—88)

This invention relates to improvements in hydraulic shock absorbers and particularly to the type known as direct acting shock absorbers.

It is among the objects of the present invention to provide a direct acting hydraulic shock absorber with both pressure actuated and inertia weight controlled fluid flow control devices which respectively regulate the action of the shock absorber in accordance with fluid pressures built up within the shock absorber and the accelerations and decelerations in the movements of the fluid displacement member of the shock absorber.

Another object of the present invention is to provide a direct acting hydraulic shock absorber in which all controlling fluid flows are directed through the fluid displacement member only.

Further objects and advantages of the present invention will be apparent from the following description, reference being had to the accompanying drawings, wherein a preferred embodiment of the present invention is clearly shown.

In the drawings:

Fig. 1 is a longitudinal sectional view of the shock absorber equipped with the present invention.

Fig. 2 is a fragmentary sectional view of the valve cage and its contained valves, the valves being shown in a position different from that of Fig. 1.

Fig. 3 is a transverse section taken along the line 3—3 of Fig. 1.

Fig. 4 is a fragmentary sectional view at enlarged scale showing the details of construction of one of the fluid flow control valves.

The present direct acting, hydraulic shock absorber comprises a plurality of concentrically arranged tubular members, the inner or smallest diameter tube forming the working cylinder 20. A head member 21 has a plurality of concentric, annular portions, the smallest diameter portion 22 extending into and press-fitted into the one end of the cylinder 20. The second tube 23, surrounding the cylinder 20 so as to form a space 24 between tubes 20 and 23, is press-fitted upon the annular portion 25 of the head member. At various points in the surface of the annular portion 25, shallow notches or grooves 26 are formed therein for providing air escapement ducts. The third tubular member 27 surrounds tube 23 for a portion of its length and is of such a diameter as to provide a narrow annular space 28 between it and tube 23. The one end of tube 27 is flared outwardly to seat upon a conical or sloping surface of the head member against which it is clamped as will be described. The next, or fourth tube 30 surrounds tubes 23 and 27 and forms the annular reservoir space 31 between it and tube 23. The one end of tube 30 is interiorly threaded to receive the threaded, largest diameter portion of the head member 21. A collar 32 resting on an annular shoulder inside tube 30, engages and presses a resilient packing gasket 33 upon the flared end of tube 27 and thus holds said tube in position upon said head member when it, the head member, is screwed into tube 30. The other end of tube 30 is closed in any suitable manner, the present drawings showing a cup-shaped portion 34 being welded thereto. On the inside of cup 34, ribs 35 are provided upon which certain parts of the shock absorber rest while still providing fluid passages.

The head member 21 has a central opening 37 which is recessed as at 38 to provide a larger diameter opening in the outer surface of the head member. A packing gland 39, of any suitable design or construction, is seated and secured in recess 38. Portion 40 of the piston rod, designated as a whole by the numeral 41, slidably extends through the packing gland 34 and the opening 37 of the head member into the cylinder 20. The end of the piston rod portion 40, extending into the cylinder, is centrally recessed and interior threads are provided in this recess adjacent its inner end, the outer end being smooth. A disc 42 is attached to piston rod portion 40 outside the packing gland 39 and to the annular, peripheral surface of said disc, one end of tube 43 is secured. This tube surrounds tube 30 and is comparatively shorter, forming a guard and dust shield around the top portion of the shock absorber. When in fully collapsed position as shown, the disc rests upon the head member 21 and end of tube 30 secured thereto.

An intermediate recess in the bottom of the recess 38 of head member 21 forms a space 44 which is in communication with the annular space 28 between the tube 23 and the baffle tube 27 by ducts 45 provided in the head member 21. This provides for the return of fluid to the reservoir 31 which may leak past the bearing surfaces between piston rod portion 40 and the opening 37 in the head member.

The bottom or end of the cylinder 20 opposite the head member 21 is provided with a valve cage 50, a cylindrical extension 51 is press-fitted into this end of the cylinder. The lower end of tube 23 is press-fitted upon a larger diameter annular portion of said valve cage. A central opening 52 in the valve cage provides a bearing in which a sleeve valve 60 balanced so as to be non-operative by fluid pressure, is slidably supported. When the shock absorber is assembled, cage 50 rests upon the ribs 35. Valve cage 50 has radial openings 53 in its annular, peripheral wall which openings are in constant communication with the space 24 between the tubes 20 and 23. This space is also in communication with the inside of the cylinder tube 20 through openings 54 in said cylinder tube, said openings being adjacent the surface of the head member inside the cylinder 20. A plurality of grooves 55 in the valve cage lead from the openings 53 to the annular surface of a central opening 52 in the valve cage. An annular groove 56 in the outer, peripheral surface of the sleeve valve 60 forms an annular chamber in the cage 50 which is in communication with the grooves 55 at all times. The one end of sleeve-valve 60 is flared out as at 61 providing an annular ledge which is yieldably urged into seating engagement with the outer, annular edge of opening 52 in the valve cage by a series of spring fingers 62 provided in the ring 63, the peripheral portion of which is attached to the valve cage in any suitable manner. Sleeve valve 60 is balanced so as to be unaffected by fluid pressure acting on the annular wall of its groove which forms chamber 56.

The valve cage 50 also contains a fluid replenishing or intake valve 70 which normally shuts off communication between the interior of cylinder 20 and the fluid reservoir 31 but under certain circumstances is actuated to permit a fluid flow from the reservoir into the cylinder. This valve 70 comprises two ring shaped, resilient discs, the central openings in which fit over a hub 71 formed on the carrier disc 72 and secured to said disc 72 in any suitable manner, preferably by swaging or spinning a portion of said hub over the outer valve disc. At its outer edge, carrier disc 72 is provided with a plurality of slots or cut-away portions 73 so that the peripheral edge of said disc lies closely to the inner annular wall of the extension 51 of the valve cage for guiding purposes while the slots 73 permit fluid flow past the disc 72. The outer annular edge of the outer disc of valve 70 is normally yieldably held in engagement with the annular ledge 74 surrounding the opening 52 in the valve cage by spring fingers 75 provided by the ring 76 which is secured in the valve cage by swaging portion 77 of the valve cage over ring 76.

As shown in Fig. 1, the end of sleeve valve 60 adjacent ledge or seat 74 in the valve cage has an annular ridge forming a seat 64 which is normally held in close proximity to valve 70 by the action of spring fingers 62. However, when fluid pressure upon disc 72 urges it downwardly from its normal position as shown in Fig. 1 into the position as shown in Fig. 2, then flexing of spring disc valve 70 due to such fluid pressure causes it to engage the seat 64, thus valve 70 mechanically moves the sleeve-valve 60 from engagement with the outer annular edge of the valve cage surrounding opening 52 and thus opens communication between annular space 24 and the fluid reservoir.

The piston rod 41, as has been stated, comprises a portion 40 which slidably extends through opening 37 in the head member 21 into the interior of the cylinder 20. Also that the inner end of piston rod portion 40 is recessed, the inner end of the recess being interiorly threaded, the outer end smooth. This threaded recess in portion 40 receives the threaded end of the other tubular piston rod portion 142, the outer end of which has an outwardly extending annular flange forming a head 143. This tubular piston rod portion 142 has three annular grooves formed in its outer periphery. The first groove 144 is adjacent the threaded end of this piston rod portion and has a series of openings 146 in portion 142 communicating therewith. Similar openings 145 in the rod portion 40 also communicate with said groove 144. The second or intermediate groove 133 has openings 147 in the portion 142 communicating therewith. The third or lowermost groove 148 is in communication with openings 149 in piston rod portion 142. Between openings 149 and head 143, the piston rod portion 142 has another series of radial openings 150.

A plurality of elements making up the fluid displacement member and its control elements are mounted on the piston rod portion 142 and they will be mentioned in their order from top to bottom. First a ring block 151 fits about piston rod portion 142 and abuts against the end of piston rod portion 40. A cylindrical extension projects from the bottom of block 151, the end of said extension being notched as at 152. A centrally apertured disc spring 153 engages the outer end of the cylindrical extension on block 151, the notches 152 providing for fluid flow through the extension on the block. Next a spacer collar 154 engages the spring 153 and the spacer collar in turn rests upon a resilient ring-disc valve 155 which rests upon the upper surface of the piston block 156. One or more centrally apertured disc springs 157 surround the spacer collar 154 and are held spaced from the disc valve 155 by a spacer collar 134 whose inwardly extending flange is between the valve 155 and the adjacent disc spring 157. As will be described springs 157 are used to load the disc valve 155. Fig. 4 clearly shows the construction of this valve mechanism which is identical with the valve mechanism at the opposite end of the piston 156. The bottom end surface of the piston is engaged by a resilient disc-spring 158 which, like disc spring 155, may be supplemented by a series of additional spring discs 159. These discs 159 surround a spacer collar 160 engaging the disc valve 158 and in turn engaged at its bottom end by a ring shaped spring 161 which rests upon the notched end of an annular extension on ring block 162. The bottom surface of block 162 is radially channelled or corrugated and is engaged by the end wall of a container 164. A bumper spring 165 is clamped against the inner end wall of the container 164. Thus it will be seen that as the piston rod portion 142 is screwed into the portion 40, all these elements 151 to 165 inclusive will be held in clamped assembly on the piston rod.

A cup-shaped piston 170 has an opening in its bottom slidably fitting about the spacer collar 154, the cylindrical portion of said member fitting slidably about the block 151. As has been stated heretofore, spring 153 has its inner annular portion clamped between the block 151 and the spacer collar 154. Its outer annular portion engages and rests upon the inner surface of the cup-shaped piston 170 so as to be predeterminately flexed thereby exerting a force upon the piston 170 to urge its extension upon the upper spring disc 157, urging the discs 157 upon the spacer collar 134 and the collar, in turn, against the disc valve 155 to maintain it upon the piston 156. The force exerted by the spring 153 is not sufficient to flex the spring discs 157 so that normally the disc valve 155 is urged against the piston 156 at a predetermined pressure and thus it may be said that disc valve 155 is predeterminately loaded, normally. However, under certain conditions as will later be explained, fluid pressure within the cup-shaped piston 170 will supplement the action of spring 153 to urge and move said piston so that it will flex disc springs 157 toward the disc valve 155 and thus increasedly load it so that its restriction to fluid flow from the annular groove 176 in piston 156 is comparatively increased. The valve mechanism including cup-shaped piston 171, disc springs 159 and disc valve 158 are identical to and act the same as the valve mechanism just described. The Fig. 4 illustrates, at increased size, the left half of the valve mechanism including valve 155.

The upper end surface of the piston block 156 is centrally recessed to provide an annular space 175 which is constantly in communication with the annular groove 133 in piston rod portion 142. This space 175 is in constant communication with an annular groove 176, in the upper surface of the piston block, by a series of predeterminately sized orifices 177 in the block. The outer upper surface of the piston is chamfered as is the outer lower surface thereof. The bottom surface of the piston block is formed similarly to the upper surface. The central recess forming annular space 180 is constantly in communication with the annular groove 148 of piston rod portion 142. Metering orifices 181 connect this space 180 with the annular recess 182 in the block.

The piston block 156 has a plurality of ducts which provide for the transfer of fluid between the working chambers 200 and 201, formed in the cylinder 20 by the piston block. For purposes of this description, chamber 200 will hereinafter be referred to as the "upper working chamber" and chamber 201 as the "lower working chamber." Every other one of said fluid ducts 202 in the piston block have one end terminating in the annular groove 176 at the top of the piston, the other ends terminating in the lower chamfered surface of the piston. The other ducts 203 have their ends terminating respectively in the annular groove 182 at the bottom of the piston and the chamfered portion of the top side of the piston. Thus the fluid exit ends of ducts 202 are controlled or restricted by valve 155 while the entry or bottom ends of said ducts are unrestricted at all times. Likewise, the fluid exit ends of ducts 203 are restricted by valve 158 while their top or fluid entrance ends are constantly free and open.

As shown in Fig. 1, the tubular piston rod portion 142 has a rod 205 of substantially lesser diameter than the inside diameter of portion 142 extending coaxially through it, said rod 205 having a head portion 206 secured in the upper end of piston rod portion 142 in any suitable manner, preferably by welding. This rod 205 is of such a length that its lower, outer end comes close to the valve cage 50 when the shock absorber is fully collapsed on its compression stroke as shown in Fig. 1.

This lower, outer end of rod 205 is threaded to receive nut 207 upon which rests the bottom cap 208 of the container 164. A bumper spring 209 is supported by said cap 208 which also carries a coil spring 210 surrounding rod 205.

An inertia weight 211, centrally apertured to fit loosely around rod 205, rests upon spring 210 and is yieldably supported in normal position by said spring. This inertia weight 211 is within the fluid filled container 164. A tubular slide valve 215, loosely surrounding rod 205, has its one end secured in the inertia weight 211 and slidably fits within the piston rod portion 142. The inner diameter of the container 164 is greater than the outer diameter of the inertia weight 211 so that a space is provided therebetween which is filled with fluid to cushion the movements of the weight. In order to dampen weight movements and render it insensible of acceleration of short duration in the movements of the piston rod 41 upon which it is resiliently supported, yet render it operative to actuate the slide valve during accelerated movements of the piston rod 41, of longer duration, said weight is provided with a ring 212 forming an extending ledge, the outer peripheral surface of which is closer to the inner wall of the container 164 than the outer surface of the weight, thus providing a restriction to the passage of fluid from one side of the ring 212 to the other as the weight moves relatively to the container, thereby acting as a dash pot to dampen weight movements.

Two annular grooves 216 and 217 are provided in the outer, peripheral surface of the slide valve 215, groove 216, when inertia weight 211 is in the normal position, connecting the openings 146 and 147 in the piston rod portion 142 and under the same conditions groove 217 connects openings 149 and 150 in said piston rod portion. However, under certain accelerated movements of the piston 156 downwardly, the inertia weight actuates the slide valve to close openings 147, and on the other to close openings 149 in response to predetermined accelerations in the upward movement of the piston 156.

The present shock absorber is adapted to control the movements of two relatively movable members as for instance the frame and axle of a vehicle. In this case the frame is the sprung mass supported on the axle by springs which are compressed when the frame and axle move to approach each other and rebounds or expands to separate the frame and axle and return them to normal position. The piston rod portion 40 with its attached cap 42 may be anchored by any suitable means, to the frame of the vehicle, and the tube 30 is attachable to the axle of the vehicle. Thus as the frame and axle of the vehicle are caused to move to approach each other, piston 156 will be moved downwardly on what is termed the "compression" stroke, to exert a pressure upon the fluid in lower working chamber 201. When the frame and axle of the vehicle move to separate due to the action of vehicle springs between the frame and axle, then the piston 156 is moved upwardly in the cylinder 20 on what is termed its "bound stroke," thereby exerting pressure upon the fluid in the upper working chamber 200.

When for instance, the axle of the vehicle is thrust upwardly to approach the frame, and as a consequence the piston 156 is moved downwardly in cylinder 20 at an acceleration insufficient to render the inertia control valve 215 effective, the piston 156 exerts a pressure upon the fluid within the lower working cylinder 201. This fluid pressure will first be exerted upon the carrier disc 72 and the valve 70 supported thereon whereby these elements will be moved from the position as shown in Fig. 1 into the position as shown in Fig. 2. The valve 70 now flexed, still closes the opening in the sleeve valve 60, however, due to its flexing from one position into another, valve 70 will actuate the sleeve valve 60 so that communication is established between its groove 56 and the fluid reservoir 31.

Pressure upon the fluid in the lower working chamber 201 will cause the fluid to flow through the piston passages 202 into the annular groove 176 through the metering orifices 177 into the space 175 thence through the annular groove 133, openings 147, groove 216, and openings 146, groove 144, openings 145 into the upper working chamber 200. This flow is established to be controlled by the inertia actuated sleeve valve 215 which normally maintains the openings 147 open and does not close them to stop the flow until the piston rod 41 and its piston 156 move at a predetermined acceleration. The primary control of fluid flow to cause the shock absorber to offer resistance to movement is offered by the valve 155 which is normally preloaded by springs 153 and 157. In order that the valve be lifted from engagement with the piston and thus establish a restricted fluid flow, metering orifices 177 are of such a size as to set up a predetermined back pressure in the annular groove 176 which when it attains a certain value will lift valve 155. Fluid will also enter the interior of the cup shaped piston 170 via the openings 152 in block 151, however, this fluid in piston 170 is not effective as long as openings 147 are not restricted or closed by the slide valve 215. Thus the valve 155 provides for a restricted flow from the lower into the upper chamber to cause the shock absorber to offer its primary resistance to approaching movements of the two relatively movable members between which the shock absorber is connected. The fluid displaced from the lower working chamber 201 into the upper working chamber 200 cannot completely be received by said upper chamber due to the presence of the piston rod in said upper chamber. Therefore, fluid displaced by this rod will pass through the openings 54 in the cylinder into the space 24 thence into the annular groove 53 of the valve cage, through slots 55, space 56, now open, into the reservoir 31.

If the downward movement of the piston is accelerated at a predetermined rate, so that the inertia weight 211 cannot follow the movement of the piston, then, due to its inertia, weight 211 will operate the sleeve valve 215 relatively to the piston rod portion 142 so that openings 147 will be reduced or substantially closed and thereby restricting or actually stopping the fluid flow in the circuit including openings 147 and the annular groove 216 of the slide valve 215. Now the entire fluid pressure is exerted upon the valve 155 and under these circumstances the loading on said valve is increased. To do this a portion of the fluid flow is directed through orifices 177, space 175, annular groove 133 and openings 152 into the interior of the cup-shaped piston 170, said fluid exerting a pressure upon said cup-shaped piston 170 in addition to the pressure exerted thereupon by the spring 153 to urge it into increased pressing engagement with the spring discs 157. The pressure actuated piston 170 will now flex the inner portion of spring discs 157 so that, through the spacer collar or ring 134, the valve 155 is urged toward the piston 156 with an increased force thus valve 155 will offer its greatest restriction to fluid flow during this accelerated movement of the piston and the shock absorber its greatest resistance to movement.

When the frame and axle of the vehicle are moved to separate due to the rebounding movement of the vehicle springs, the piston of the shock absorber is moved upwardly in its cylinder 20, thereby to exert a pressure upon the fluid in the upper working chamber 200. As soon as the piston 156 starts to move upwardly, the valve 70 and its carrier 72 will be lifted, resulting first in the release and movement of the sleeve valve 60 into its normal position by springs 62 as shown in Fig 1 where communication between the upper working chamber 200 and the reservoir is discontinued and at the same time lifting of the valve 70 will open communication between the reservoir 31 and the lower working chamber 201 through said sleeve valve 60, inasmuch as valve 70 is now disengaged from said sleeve valve and also from its seat 74.

Pressure upon the fluid in the upper working chamber 200 cannot force the fluid through openings 54 and annular passage 24 into the reservoir, for the sleeve valve 60 now closes communication between the upper working chamber and the reservoir, and as has been mentioned heretofore, sleeve valve 60 is balanced so as not to be effected by fluid pressure.

In response to pressure on the fluid in chamber 200, the first flow occurs through the following circuit: through the piston passages 203 into annular groove 182, thence through metered orifices 181 in the piston, to the annular groove 148, in the piston rod portion 142, thence through openings 149 in said portion to the annular groove 217 in the slide valve, thence through the openings 150 in the piston rod portion 143 through the passages provided by the annular serrations or corrugations in the bottom of the disc 162 and thence into the lower working chamber 201. This circuit is the one to be controlled by the inertia valve and thus is designed to normally by-pass the minimum volume of fluid.

The primary controlling flow of fluid is past the valve mechanism including valve 158 and spring discs 159. As has previously been stated, this valve mechanism is similar to the valve mechanism including valve 155 and functions in identical manner. As long as the inertia weight controlled sleeve valve 215 maintains openings 149 open, valve 158 operates under normal preload to control fluid flow from the piston passages 203. However, when due to predetermined acceleration in the upward movement of the piston assembly, valve 215 closes openings 149 and thus causes full fluid pressure to be established within the cup-shaped piston 171, thereby to increase the loading on valve 158, then valve 158 will increase its restriction and thereby cause the shock absorber to offer a greater resistance to the separating movements of the frame and axle of the vehicle.

From the foregoing it may be seen that applicant has provided a hydraulic, direct acting, inertia controlled shock absorber in which all of the controlling fluid flow is directed through the piston of the shock absorber.

One of the valves in the valve cage at the bottom of the cylinder acts as an intake valve, the other as a valve which either opens and closes communication between the upper working chamber of the cylinder and the reservoir. Under no circumstances do the valves in the valve cage at the bottom of the cylinder provide for movement controlling, restricted flows of fluid. As has been said before, all restricted fluid flows providing for the resistances offered by the shock absorber to such movements are established only through the piston.

While the embodiment of the present invention as herein disclosed, constitutes a preferred form, it is to be understood that other forms might be adopted, all coming within the scope of the claims which follow.

What is claimed is as follows:

1. An hydraulic shock absorber comprising, in combination, a cylinder having a valve cage at one end; a piston forming two working chambers in said cylinder, said piston having a plurality of fluid passages providing for the transfer of fluid between said chambers; spring loaded valves and an inertia weight controlled valve for regulating fluid flow through the piston passages as the piston is reciprocated; a fluid containing reservoir in communication with both working chambers; and valves in the valve cage, each normally cutting off communication between a respective working chamber and the reservoir, one of said valves opening to permit fluid from the reservoir to enter the one chamber as the piston moves away from the valve cage, said one valve engaging the other valve and being operative by fluid pressure as the piston moves toward the valve cage, to actuate said other valve to permit fluid to flow from the other working chamber into the reservoir.

2. An hydraulic shock absorber comprising, in combination, a cylinder having a head at one end and a valve cage at the other; a piston dividing the cylinder into two working chambers, said piston having passages connecting the two chambers, one group of said passages having dual fluid flow control means comprising a spring loaded valve and an inertia valve for controlling the fluid flow through said one group of passages in one direction, the other group having similar spring loaded and inertia valves for controlling fluid flow through the piston in the opposite direction; a fluid containing reservoir in communication with both working chambers; and valves in the valve cage each normally shutting off communication between a respective chamber and the reservoir, one of said valves operating in response to movement of the piston in one direction, to permit fluid to flow from the reservoir into the one chamber and in response to movement of the piston in the opposite direction to actuate the other valve in the cage for permitting the fluid to flow from the other chamber into the reservoir.

3. An hydraulic shock absorber comprising, in combination, a cylinder having a head at one end and a valve cage at the other; a piston having a rod slidably extending through the head and dividing the cylinder into the working chambers and having passages connecting the two chambers; dual fluid flow controlling means for one group of said piston passages, one of said means normally closing its portion of said group of passages but operative in response to fluid pressure in the one chamber to establish a fluid flow into the other chamber, the other, an inertia weight controlled means normally maintaining its passage portion open but operative in response to predetermined acceleration in the movement of the piston in one direction to shut off the fluid flow through its passage portion, the other group of piston passages having similar fluid pressure and inertia weight controlled means controlling fluid flow similarly, but in the opposite direction and in response to opposite movement of the piston; a fluid containing reservoir connected to both working chambers; and valves in the valve cage, each normally shutting off communication between a respective working chamber and the reservoir, the one valve being operative by fluid pressure as the piston moves in one direction to open communication between the one chamber and reservoir, and as the piston moves in the other direction to actuate the other valve to open communication between the other chamber and the reservoir.

4. An hydraulic shock absorber comprising, in combination, a cylinder having a head at one end and a valve cage at the other; a piston having a rod slidably extending through the head and dividing the cylinder into two working chambers and having passages connecting the two chambers; pressure actuated and inertia weight actuated valves operative, in response to movements of the piston in one direction or the other, to control the flow of fluid through said piston passages; a fluid containing reservoir in communication with both working chambers; and two valves in the valve cage each normally closing the communication between a respective working chamber and the reservoir, one of said valves being balanced as regards pressure effect, the other being operative by fluid pressure as the piston moves in one direction to open communication between the one working chamber and reservoir to permit fluid to flow into said chamber and being operative to actuate the balanced valve to open communication between the other chamber and reservoir as the piston moves in the other direction.

5. An hydraulic shock absorber comprising, in combination, a cylinder having a head at one end and a valve cage at the other; a piston having a rod slidably extending through the head and dividing the cylinder into two working chambers and having passages connecting the two chambers; pressure actuated and inertia weight actuated valves operative, in response to movements of the piston in one direction or the other, to control the flow of fluid through said piston passages; a fluid containing reservoir in communication with both working chambers; and two valves in the valve cage each normally closing the communication between a respective working chamber and the reservoir, one of said valves being balanced as regards pressure effect, the other being operative by fluid pressure as the piston moves toward the head of the cylinder to open communication between the chamber adjacent the valve cage and the reservoir to permit fluid to flow from said reservoir into said chamber and being operative also, as the piston moves toward the valve cage to actuate the balanced valve and thereby open communication between the reservoir and the chamber adjacent the head member.

6. An hydraulic shock absorber comprising, in combination, a cylinder provided with a head member at one end and a valve cage at the other; a piston in said cylinder forming two working chambers therein, said piston having passages providing communication between said chambers; a rod extending through the head member and attached to the piston; dual means for controlling the fluid flow through the piston passages as the piston is reciprocated in one direction or the other, said means comprising a valve on each side of the piston normally providing the maximum restriction to fluid flow through a respective group of said passages and comprising also an inertia weight controlled valve normally providing a minimum restriction to said fluid flow but adapted to increase its restriction in accordance with accelerations in the reciprocating movements of the piston and rod; a fluid containing reservoir in communication with both working chambers; and valves in the valve cage, each normally shutting off communication between the reservoir and a respective chamber, one of these valves permitting fluid to flow from the reservoir into one chamber as the piston moves in one direction, the other of these valves being engaged and moved directly by said one valve, to open communication between the other chamber and reservoir as the piston moves in the opposite direction.

7. An hydraulic shock absorber comprising, in combination, a cylinder having a head at one end and a valve cage at the other; a rod extending through the head and having a piston slidable in the cylinder and dividing said cylinder into two chambers; a fluid containing reservoir in communication with each of said cylinder chambers; a plurality of ducts in the piston providing communication between the two cylinder chambers, certain of said ducts having a two-way discharge outlet into the one chamber, one normally open and the other normally closed by a resilient spring valve on the piston, the other ducts having a similar two-way discharge outlet into the other cylinder chamber, one normally open the other normally closed by a resilient spring valve on the other side of the piston; an inertia valve resiliently suspended on the piston rod for controlling the two normally open discharge outlets in accordance with accelerations in the reciprocation of the piston rod in one direction or the other respectively; and valves in the valve cage, one, normally shutting off communication between the one cylinder chamber and the reservoir, but adapted to permit fluid to flow unrestrictedly into said chamber as the piston moves in one direction, the other valve normally shutting off communication between the other chamber and the reservoir but operated by the intake valve moved in response to the movement of the piston in the opposite direction to open communication between said other chamber and the reservoir.

8. An hydraulic shock absorber comprising, in combination, a cylinder provided with a head member at one end and a valve cage at the other and divided into two working chambers by a piston having a rod extending through the head member and passages providing for the transfer of fluid between said chambers as the piston is reciprocated; pressure actuated and inertia weight controlled valves on the piston and in the rod, for controlling the flow of fluid between said chambers as the piston is reciprocated; a fluid containing reservoir in direct communication with each working chamber; and two valves in the valve cage, the first normally shutting off communication between the reservoir and the working chamber adjacent the valve cage, but operative in response to fluid pressure, as the piston moves away from the valve cage, to open and permit fluid flow from the reservoir into the last mentioned chamber, the second valve being balanced against the effects of fluid pressure and normally cutting off communication between the chamber adjacent the head member and the reservoir, but being operative directly by the said first valve as the piston moves toward the valve cage, to open communication between the chamber containing the piston rod and the reservoir to permit fluid displaced by said piston rod to flow into the reservoir.

9. An hydraulic shock absorber comprising, in combination, a cylinder provided with a head member at one end and a valve cage at the other and divided into two working chambers by a piston having a rod extending through the head member and passages providing for the transfer of fluid between said chambers as the piston is reciprocated; pressure actuated and inertia weight controlled valves on the piston and in the rod, for controlling the flow of fluid between said chambers as the piston is reciprocated; a fluid containing reservoir in direct communication with each working chamber; and two valves in the valve cage, the first normally shutting off communication between the reservoir and the working chamber adjacent the valve cage, but operative in response to fluid pressure, as the piston moves away from the valve cage, to open and permit fluid flow from the reservoir into the last mentioned chamber, the second valve being balanced against the effects of fluid pressure and normally, yieldably urged into contact with the said first valve for cutting off communication between the chamber containing the piston rod and the reservoir and being operative by the said first valve in the cage as the piston moves toward said valve cage, to open communication between the chamber containing the piston rod and the reservoir to permit fluid displaced by said rod to flow to the reservoir.

10. An hydraulic shock absorber comprising in combination, a cylinder having a head member at one end and a valve cage at the other, a piston dividing said cylinder into two working chambers, said piston having passages connecting said two chambers; a resilient disc valve at each end of the piston, each valve controlling the flow of fluid from a respective group of said passages as the piston is reciprocated; a normally open fluid shunting circuit in the piston leading from each group of passages around the valve into the displacement chamber into which the respective passages discharge when said valves open; a valve loading mechanism for each disc valve, said mechanism constantly being in communication with the shunting circuit; an inertia weight controlled valve having means normally forcing one portion of the shunting circuit but operative in response to predetermined accelerative movements of the piston to close the shunting circuit whereby the loading mechanism is energized to exert an increased pressure upon the valve to increase its restriction to fluid flow; a fluid containing reservoir in communication with both working chambers; and valves in the valve cage each normally shutting off communication between the respective chamber and the reservoir, one of said valves operating in response to movement of the piston in one direction, to permit fluid to flow from the reservoir into the one chamber and in response to movement of the piston in the opposite direction to actuate the other valve in the cage for permitting the fluid to flow from the other chamber into the reservoir.

11. An hydraulic shock absorber comprising in combination, a cylinder having a head member at one end and a valve cage at the other; a piston dividing the cylinder into two working chambers, said piston having a plurality of fluid passages connecting said two chambers; a resilient disc valve engaging each end of the piston, each valve controlling the flow of fluid through a respective group of said passages, one in one direction, the other valve in the opposite direction; normally open fluid passages provided by the piston, each leading from beneath a respective valve to the working chamber into which said valve is adapted to discharge fluid; a valve loading mechanism comprising a block carried by the piston and a cup-shaped member slidably fitting about said block, forming a space between it and the block in constant communication with said normally open fluid passage, said cup-shaped member being yieldably urged into engagement with the valve by a spring in said space; an inertia weight controlled valve having means normally forming one branch of said normally open passage, said inertia valve being operative in response to predetermined accelerations in the movements of the piston in one direction or the other to close one or the other of said normally open passages thereby directing full fluid pressure upon the cup-shaped member for moving it to exert an increased pressure upon its respective valve; a fluid containing reservoir in communication with both working chambers; and valves in the valve cage each normally shutting off communication between a respective chamber and the reservoir, one of said valves operating in response to movement of the piston in one direction, to permit fluid to flow from the reservoir into the one chamber and in response to movement of the piston in the opposite direction to actuate the other valve in the cage for permitting the fluid to flow from the other chamber into the reservoir.

EDWIN F. ROSSMAN.